Aug. 17, 1954

E. P. BENTLEY 2,686,452

COLOR MATCHING APPARATUS

Filed July 21, 1946

INVENTOR
EDWARD P. BENTLEY
BY
Herbert H. Thompson
HIS ATTORNEY

Aug. 17, 1954

E. P. BENTLEY 2,686,452

COLOR MATCHING APPARATUS

Filed July 21, 1948

INVENTOR
EDWARD P. BENTLEY
BY
HIS ATTORNEY

Patented Aug. 17, 1954

2,686,452

UNITED STATES PATENT OFFICE 2,686,452

COLOR MATCHING APPARATUS

Edward P. Bentley, Roslyn Heights, N. Y., assignor to Instrument Development Laboratories, Inc., Williston Park, N. Y., a corporation of New York Application July 21, 1948, Serial No. 39,910

1 Claim. (Cl. 88—14)

This invention relates to color comparing or matching instruments designed to replace the human eye, and therefore responsive to the same color distinguishing factors which have been found to govern the human eye in judging colors and shades. Hence, like the eye, I have constructed my invention so that it is substantially unresponsive to the illumination level used, or to stray light or to the detailed spectro-photometric curves of colors.

The human eye has been found to gauge colors by what is known as its tristimulus factors, that is, by the relative percentage present of the three primary colors, red, green and blue. My color meter is arranged to operate on the same tristimulus principle, using the true primary color light filters in succession for the purpose.

According to my invention, I may also use filters of other than tristimulus type to select spectral bands for special purposes.

Basically my color meter consists of a flicker photometer which views alternately and rapidly the two colors being compared, for instance, a standard color and the sample under test or white and a color sample. The two colors under test are placed in a hollow "integrating" sphere to secure equal, shadowless, indirect illumination thereof. The reflected light from each is separately directed through a split lens and brought to a focus on a rotating decentered lens or wobbling reflector which directs the light reflected from first one and then the other of the colors through a light filter and then to a photoelectric cell of great sensitivity. The output of the cell therefore will be uniform only if the colors are matched. If not, there will be an A. C. ripple output voltage (superimposed on a direct current voltage) which will have the same frequency as that of the lens or reflector wobble, and hence may be arranged to operate a meter showing the mismatch in magnitude and direction (i. e., which color is the brighter). The values of this mismatch for the three filters constitute a complete definition of color difference.

Referring to the drawings showing two forms my invention may embody,

Figure 2:
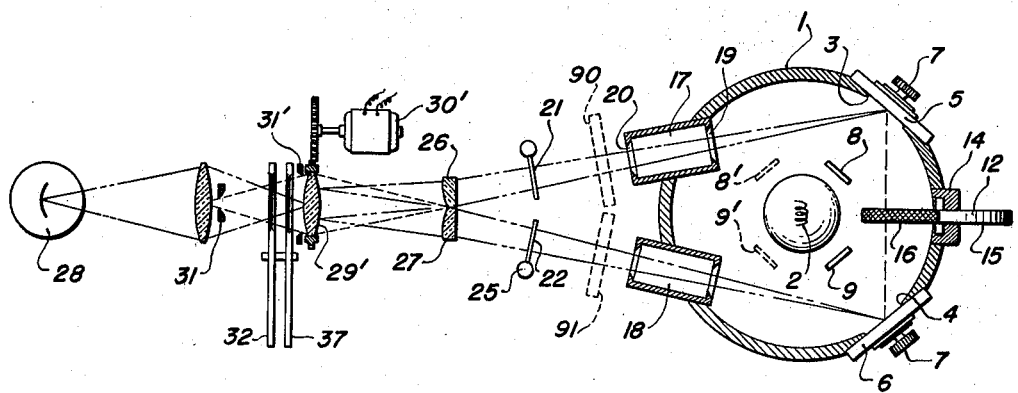
Fig. 2 is a diagrammatic view of a modified form of the device partly in section.

The basic unit of my apparatus comprises a holder for the two color samples to be compared. Preferably, this holder is made in the form of a hollow sphere 1, having a diffusely reflecting white interior. Preferably, at the center of the sphere is a light source 2, such as an electric bulb, actuated from a constant direct current source, such as a battery or from an alternating current source, which produces light flicker of some frequency different from the optical flicker frequency. The sphere has two opposite openings 3 and 4 at which may be detachably secured the holders or plates 5 and 6 for the color samples being compared. These plates may be readily removed and replaced as by means of thumb screws 7 (Fig. 2).

Figure 1:
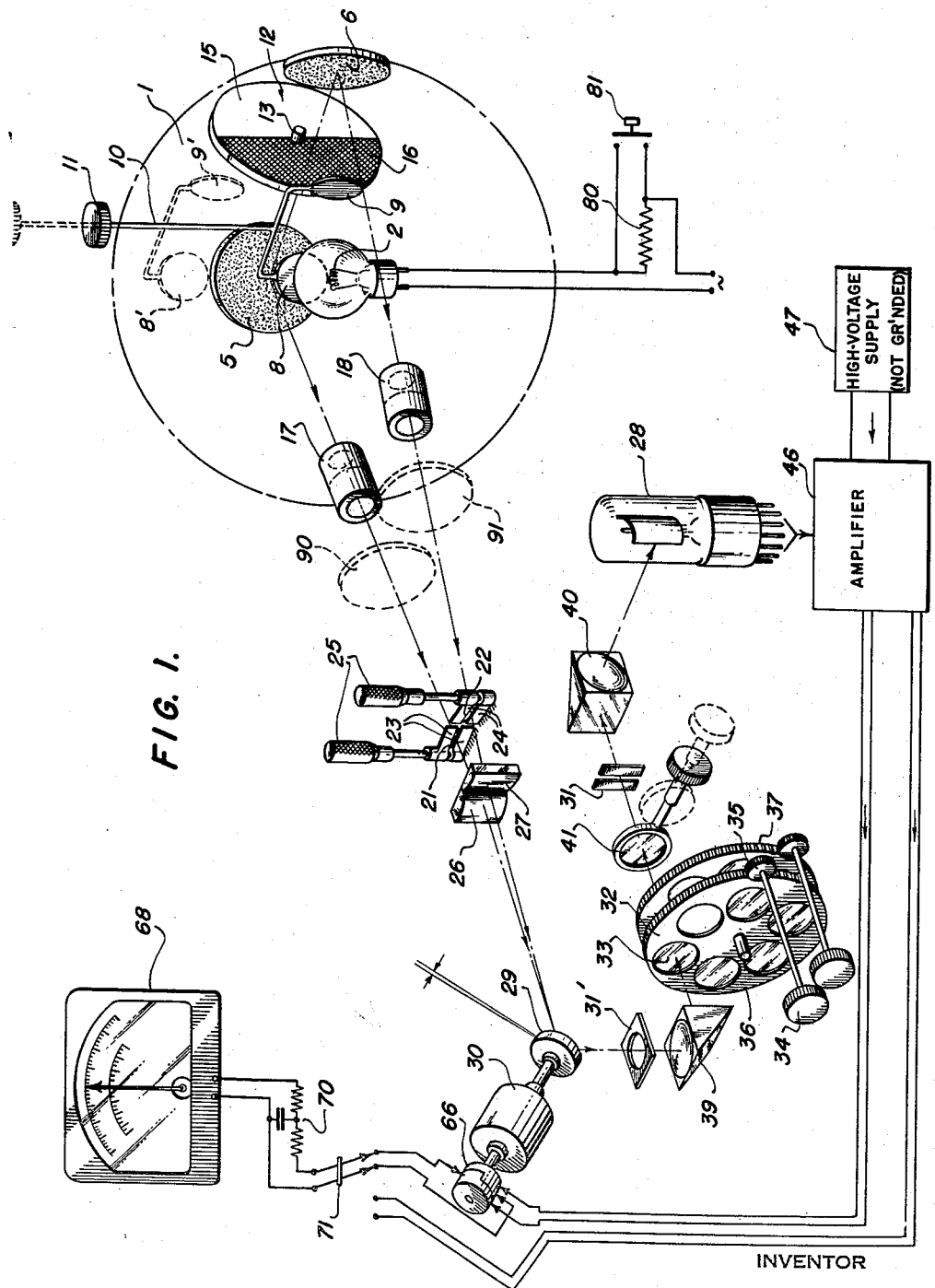
Fig. 1 is a diagrammatic perspective view of my color matching device.

Means are provided within the sphere for cutting off the direct rays between the light source and the color samples. Such means may be in the form of a pair of shutters 8 and 9 which are preferably movably mounted in the sphere, so that they may be removed from the position shown in full lines in Fig. 1 or Fig. 2 to the position shown in dotted lines in either figure. In Fig. 1 the shutters are shown as mounted on a common forked rod 10 which may be lifted to the dotted line position by means of the thumb piece 11, if desired. In Fig. 2 the shutters are mounted on a rotatable rod (not shown) so that they may be rotated out of position as shown in dotted lines 8', 9' in this figure.

I also preferably provide in the wall of the sphere, a specular wheel or disc 12 which is shown as mounted on a shaft 13 rotatably mounted in bearings in a block 14 secured in the wall of the sphere. One part of this wheel is provided with white surfaces 15 and another part is provided with black surfaces 16, to present either type of surface at the area from which specular reflected light from the other sample would originate.

The primary light reflected from each color is shown as passing out of the sphere in converging rays through stray light stops in the form of short tubes 17 and 18 containing or forming stray light stops 19, 20 at both ends of each tube, thus cutting off all light except that reflected from the color surfaces. These stops are so positioned and shaped that light from no part of the bright sphere surface passes beyond the same. The stops may be fixed or made adjustable in size as are camera shutters. The light from each color sample passes through what I term "vertical aperture stops" or "zeroing micrometer slits" 21, 22 between horizontal plates 23, 24, the spacing of which is vertically adjustable with great precision. For this purpose, one of each pair of plates has a micrometer screw adjustment affected by turning the knurled thumb piece 25 and are provided with oppositely facing polished knife edges.

The height of the slits is accurately controlled to permit precise control of the amount of light received from the samples from a maximum down to zero. Beyond the slits the light passes through a pair of prisms 26, 27 having spherical surfaces so as to act as both prisms and lenses and which bring the beams to a focus on what I may term an alternating viewer or flicker device, which acts to direct the light first from one sample and then the other through a color filter to a photoelectric cell or photomultiplier 28. This flicker device may take the form of a mirror or other reflector 29, mounted so as to be rotated rapidly from a motor 30. Also driven by said motor at the same speed is a commutator 80. While the mirror may be mechanically balanced and symmetrical, it is optically slightly off center or wobbling, so that the light first from one sample and then from the other is reflected in the same straight line onto the photoelectric cell, without interruption. A field stop 31' common to the beams from both samples, serves as both a horizontal and vertical stop. Stops 21 and 31' are so designed that the lenses do not have to be color corrected thereby avoiding the use of a chromatic lens.

A color holding wheel 32 provided with apertures within which are placed glass or other transparent pieces 33 of the three primary colors is placed in the path of the reflected flickering beam, the wheel being adjustable as by means of thumb piece 34 and pinion 35 meshing with teeth on the periphery 36 of the color wheel. Such an arrangement of the three primary colors, which can be brought under operation sequentially, I refer to in this specification as a tristimulus light filter, which term is also used to define such a structure in the appended claims. Obviously, other combinations of color may be used for special tests if desired, but the tristimulus light filter is especially useful in my color matching apparatus. A similar second wheel 37 may be provided if desired for varying the spectral distribution of the light passing to the photoelectric cell. Suitable prisms or other reflectors 39, 40 may be used to properly direct the light.

Still a third light filter 41 may be provided which is shown as movably mounted, so that it may be removed and replaced with any selected filter. Another horizontal aperture light stop 31 may also be provided similar to stops 21, 22 except with the slit vertical to act as a horizontal aperture stop for both samples. Light falling on the photoelectric cell produces an output which is dependent and responsive to the amount and color of the light received. If light of equal intensity is received from both samples, the output current is constant; if the samples are not matched the current output will vary slightly at a frequency equal to the speed of rotation of the flicker mirror, and in an amount proportional to the mismatch. The photoelectric cell will, therefore, produce a signal which consists of a steady current proportional to the light received on which is superimposed a ripple, the amplitude of which varies with the mismatch variations. The ratio of the ripple amplitude to the average current output is determined only by the corresponding ratios in the received light signals, while the absolute value of the currents depends upon the voltage applied to the cell, the intensity of the light and the spectral sensitivity of the photoelectric multiplier. The final output, however, is made independent of all the latter factors.

The photoelectric multiplier is a known form of very sensitive photoelectric cell in which the original photoelectric current produced by the light falling on the photoelectric sensitized surface is multiplied many times by reflection of the electrons back and forth between the charged plates within the tube, as indicated generally at 45 in the wiring diagram. I employ a special network in connection therewith somewhat in the nature of automatic volume control in order to secure an output which resembles closely the means by which the human eye judges colors, as explained above. In judging colors, the human eye is not influenced by the over-all light intensity or by the strictly spectral quality of the light nor, of course, by the voltage supplied to the photocell. Hence, I so design my special feed-back network that the output of the amplifier to the final indicating meter is independent of the light intensity or spectral quality and voltage supplied to the cell.

Figure 3:
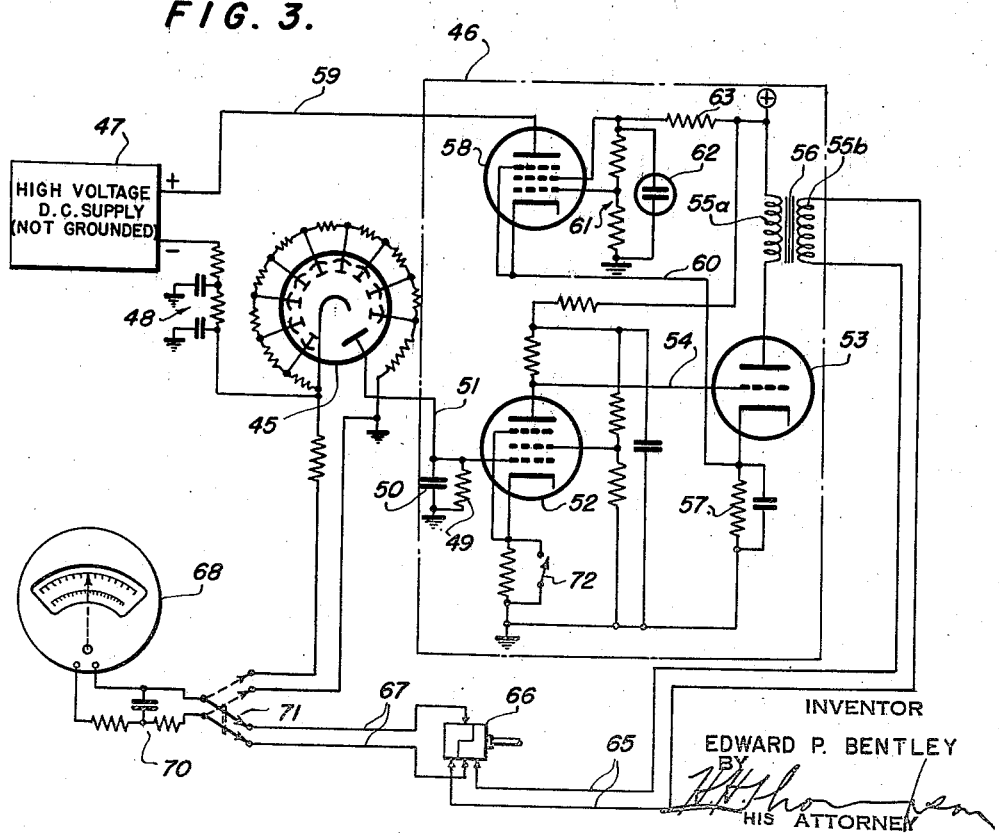
Fig. 3 is a wiring diagram of the electrical portions of the device including the photoelectric multiplier and a network rendering the output insensitive to changes in total illumination.

The preferred electronic system of the present invention is illustrated in Fig. 3, wherein that portion of the system which amplifies the signal output from the photoelectric tube 45 and maintains the average level, or the magnitude of the D. C. component, of the signal substantially constant is illustrated as contained within the dot-dash rectangle 46. As hereinabove described, light transmitted from the sample and the standard of comparison is alternately impressed upon the photoelectric tube indicated at 28 in Figs 1 and 2 and which is represented at 45 in Fig. 3 to thereby control the output of the tube in accordance with the intensity of the light falling thereupon and the spectral sensitivity of the tube. Power is supplied to the tube from a high voltage D. C. supply 47, the positive side of which is connected to the plate of a control tube 52 hereinafter more fully described and the negative side of which is connected through a filter network indicated generally at 48 to the cathode of photoelectric tube 45. The plate of tube 45 connects through lead 51 to input resistor 49 and by-pass condenser 50 to ground and the plate of tube 45 is connected through lead 51 directly with the control grid of amplifier tube 52. Tube 52, which is preferably a pentode such as a 9001 tube, constitutes the first stage of a high gain, direct coupled amplifier, the second stage comprising preferably the triode 53. The plate of tube 52 is connected directly through lead 54 to the grid of tube 53 while the output of tube 53 includes the primary 55a of an output transformer 56. The cathode of tube 53 is connected with a relatively large cathode bias resistor 57, so that a fairly high potential drop may be created across the resistor with normal plate current passing through the tube for a reason hereinafter set forth. The foregoing portion of the circuit of Fig. 3 will operate as a high gain amplifier for the signal voltage supplied to the control grid of tube 52, and the output is supplied to the primary 55a of the output transformer 56.

However, in order that the meter connected with the output of the electronic amplifier may provide accurate readings on the same calibrated scale for specimens or samples having various light reflectivity or light transmission properties, the average signal level or the magnitude of the D. C. component should be kept substantially constant so that for any given difference value in comparison the meter will provide the same or accurate indications thereof irrespective of light intensity variations and spectral sensitivity of the photoelectric tube. For this purpose, therefore, I provide the tube 58 and its associated circuit for maintaining the signal level substantially constant. In the embodiment herein illustrated, tube 58 is a pentode which may be of the 9001 type, the plate of which is connected through lead 59 to the positive side of high voltage supply 47 as hereinbefore described. The cathode of tube 58 is connected through lead 60 directly with the cathode of tube 53. The control grid of tube 58 is supplied with a fixed bias voltage as, for example, from a voltage divider indicated generally at 61, the resistors of which may be shunted by means of a condenser or, alternatively, a voltage-regulating neon tube 62. It will be noted that the tube 58 is connected in circuit with the high voltage supply and to the photoelectric tube 45 and is so biased that it will function in response to the signal voltage in the amplifier portion of the electronic circuit to control the power supply to the photoelectric tube and thereby maintain the average signal voltage level, or the D. C. component of the signal, substantially constant.

The operation of the circuit above described may be better understood by assuming circuit values and operating voltages. Let us assume that the output of the photoelectric tube builds up to provide a negative voltage of approximately one volt across the input resistor 49 to tube 52 which may be of the order of two megohms. Further assume that the plate voltage of tube 52 in response to the signal voltage on the control grid thereof amounts to a value of 30 volts. Since the plate of tube 52 is connected directly to the grid of tube 53, the grid of tube 53 will also have a potential of 30 volts. It will be noted that tube 53 operates substantially as a cathode follower amplifier because of the high cathode bias resistance 57. With the foregoing potential values, the cathode potential of tube 53 will also rise to a higher voltage than the grid, say about 35 volts, since the grid of tube 53 is normally slightly negative with respect to the cathode thereof. Furthermore, since the cathodes of tubes 53 and 58 are connected directly together, the cathode of tube 58 will rise to the same potential as that of tube 53. Assuming that the grid of tube 58, to which a fixed bias potential is applied, is biased to 30 volts above ground, the grid cathode potential drop in tube 58 will be about 5 volts which is the correct voltage for operation of this tube having 950 volts connected to the plate thereof through a resistor such as that indicated at 63 which may be the order of 10 megohms.

It will be evident that with the above assumed operating conditions, should the voltage across the input resistor 49 increase in magnitude, it will drive the control grid of tube 52 more negative since the input thereto is a negative voltage. Hence, the plate of tube 52 and the grid of tube 53, likewise, will become more positive. The cathode of tube 53 therefore will become more positive and hence the cathode of tube 58 will become more positive. Since the control grid of tube 58 is of a fixed potential, the increase in the cathode potential in a positive direction will tend to prevent current passing through tube 58. Hence, the current through the amplifier dropping resistors of the photoelectric tube will decrease with the result that the voltage applied to the amplifier plates of the photoelectric tube 45 will correspondingly decrease, with the result that the amplifier sensitivity and the current output from the tube 45 will drop. Hence, it should be clearly seen that any increase in the output of tube 45 will act through the circuit above described to eliminate itself such that the average output of the tube will return to the predetermined level. However, an appreciable period of time will be required for the circuit to react in this manner, such, for example, as a few seconds which is a relatively long time period as compared to the frequency or period of the A. C. ripple produced from the variations in light intensity which occur at 60 cycles per second, as above assumed. Therefore, the correction or voltage level regulation will not operate to affect the A. C. ripple but will regulate longer period voltage variations to maintain the average signal level substantially constant.

The output of circuit 46 which is an A. C. voltage having an amplitude proportional to the comparison difference between the sample and the standard of comparison and which will be of a constant signal level is derived from the secondary 55b of output transformer 56. This signal may be supplied to a phase-sensitive rectifier, the output of which is supplied to a suitable meter. A reference voltage of the same frequency as the frequency of alternation of the light beams from the specimen and the comparison standard on the photoelectric tube and of fixed phase relation thereto, should also be supplied to such a phase-sensitive rectifier for phase-sensing purposes. This may be accomplished by driving an A. C. generator from the motor 30 which drives the optically off-set lens or mirror. In the embodiment illustrated, however, the signal voltage is supplied to an amplifier 46, the output of which is supplied to output transformer 56 through leads 65 to a commutator 66 which is driven from motor 30 as illustrated in Fig. 1 and which functions as a double-pole, double-throw switch. The output of the commutator is supplied through lead 67 to meter 68 which is preferably of the zero, center-reading type and may be, for example, of the galvanometer type. A filter circuit indicated generally at 70 may be interposed between the commutator and the meter to eliminate spurious signals derived through commutation. If desired, a switch 71 may be employed to disconnect the meter from the output of the circuit hereinabove described and to connect it directly across the photo tube for test purposes.

From the foregoing, it should be clear that the signal derived from the output transformer 64 will function to provide a needle deflection in one direction for a difference in one sense between the specimen and the standard and an opposite deflection of the needle of the meter from the zero center position for an opposite sense in difference between the sample and the standard. If the standard and the sample are matched, there will be no A. C. ripple signal and therefore the needle of the meter will remain in zero reading position. Also, as above indicated, by virtue of the operation of tube 58 in maintaining the average signal level substantially constant, a single meter calibration or scale may be employed under all comparison conditions. Preferably, however, we connect a switch 72 in shunt with the cathode impedance of tube 52, so that the gain of the amplifier may be varied. In other words, if the switch 72 were to be closed, the gain would be increased and thereby provide a greater deflection of the needle of meter 68 and a second scale may be provided on meter 68 for reading under high gain conditions. In this way, a still more accurate indication of small comparison differences will be obtained. The scales may be calibrated in terms of percentage mismatch of colors or percentage difference in light transmission or in other desired units of comparison.

The electronic control and computing system shown in the wiring diagram of Fig. 3 performs three functions:

(a) The electron multiplier receives light and produces an electrical signal proportional to the integral over the visible wavelengths of the product of light intensity at each wavelength multiplied by the sensitivity of the electron multiplier at that wavelength, the output signal consisting of a direct current representing the average value of light received, with a superimposed alternating ripple which represents the variation in brightness between the two samples, as stated.

(b) The electronic amplifier has such high gain that a change of only a few percent in the multiplier output can reduce the multiplier gain by many thousand fold, thus ensuring that very great changes in incident light will produce only minor variations in the steady component of multiplier output.

(c) The electronic system also performs the third function of measuring signal variation and ripple, since it will amplify the variations in multiplier signal, as well as the steady signal. Since the multiplier output remains substantially constant regardless of light intensity, by the means described above, any given percentage ripple in light will produce a corresponding amplitude of current variation in the multiplier signal. This variation is amplified and eventually appears as a ripple or difference signal in the output transformer 56. The magnitude and phase of the signal (phase measured relative to the position of the optical scanning or flicker control) represent, in magnitude and sign, the difference between the two beams of light which are being scanned. The difference signal is phase detected and appears on the meter as a plus or minus indication (right or left from zero) which shows the magnitude and sign of the difference in the sample and standard of comparison.

A capacitive-resistive filter 70 is preferably provided to filter noise from the final meter signal. If a wattmeter is used instead of a galvonometer type meter 68, sufficient averaging may be produced by inertia of the meter, so that this filter is not necessary. The meter may be used for several purposes, by switching, to measure the voltage of lamp 2 and the multiplier voltage. Lamp voltage may be controlled so as to produce closely fixed illumination conditions as by cutting in and out the resistor 80 by shunting switch 81. The multiplier voltage, as a consequence of the A. V. C. network described above, bears a unique relationship to light intensity (i. e., sample effectance) and can be calibrated to represent approximate luminosity.

It is understood that the exact circuit shown is preferred but not limiting, since any form of voltage amplifier which will receive multiplier output and will control multiplier voltage so as to substantially prevent changes in continuous multiplier output, will serve. Further, it is not necessary that the regulation described above in section (b) and the ripple signal detection of (c) may be performed by common elements, or even be taken from a common multiplier terminal. It is further possible, though not normally desirable, to use separate light detectors for the two functions.

If the colors are matched and of the identical shade, the meter will read zero in the center. If mismatched and the unknown sample has more of the primary color of the selected color in the color wheel the meter will move to the right (for example), while if the reverse is true the meter will move to the left—the amount of such displacement in each case being proportional to the degree of mismatch. If, however, the meter does not read zero but has the same reading for each of the primary colors, it indicates that the colors are matched, but that the shade is slightly different. Thus a slight lightening of the shade is caused in fabrics in the final stretching process, but the color is not affected. When this occurs, the shade may either be corrected or be allowed for in case the fabric under test is to be later stretched or pre-shrunk.

The colors of transparent samples may also be compared by similar methods. In this case the samples may be placed outside the sphere as at 90 and 91 and matched white colors used at 4 and 5.

The only material difference in the modified form of the invention described in Fig. 2 from the form in Fig. 1, other than already mentioned, is that the wobbling or oscillatory mirror 29 of Fig 1 is replaced in Fig. 2 by a lens 29' rotated from a motor 30' and optically, but not mechanically, decentered, so that it deviates the light slightly by prism action, but does not move laterally as it rotates, although the optical center oscillates and may therefore also be referred to as "oscillatory."

The micrometer vertical aperture stops 23 and 24 are adjusted in initially setting up the instrument to compensate for any difference in the amount of light falling on the two samples. One stop, say 23, is adjusted for a unit opening, usually marked 100. The other stop 24 is then adjusted so that the meter 68 reads zero, showing that the amount of illumination is equal.

It is interesting to note that colors may also be compared with a white sample, since white contains an equal mixture of the three primary colors, as stated.

As many changes could be made in the above construction and many apparently widely different embodiments of this invention could be made without departing from the scope thereof, it is intended that all matter contained in the above description or shown in the accompanying drawings shall be interpreted as illustrative and not in a limiting sense.

What is claimed is:

A color matching device comprising a hollow reflecting sphere having therein an incandescent electric lamp as a source of white light, spaced mounts for the color samples in the wall thereof, whereby the samples are continuously illuminated, means for cutting off direct illumination of said samples by said source, separate openings each having stray light preventing means in said sphere from which light from the two samples separately emerges in converging beams, a photomultiplier tube, a mirror located in the common path of said beams, means for rotating and wobbling the same whereby first one and then the other of said beams is alternately and rapidly directed on said cell without cutting off either beam, an amplifier feedback network for preventing variations in voltage supplied to said lamp or tube from affecting the output of said tube, a commutator synchronized with said mirror rotating means for separating the output of said tube during the periods of elimination from one beam from those of the other beam, and a zero reading meter in which the integrated outputs of one beam are matched against the integrated outputs of the other beam whereby the presence and amount of mismatch is indicated.

References Cited in the file of this patent

UNITED STATES PATENTS

| Number | Name | Date |
|---|---|---|
| 1,524,180 | Keuffel | Jan. 27, 1925 |
| 1,806,199 | Hardy et al. | May 19, 1931 |
| 1,816,047 | Keuffel | July 28, 1931 |
| 1,964,365 | Rajek et al. | June 26, 1934 |
| 2,124,600 | Worrall | July 26, 1938 |
| 2,228,559 | Cox | Jan. 14, 1941 |
| 2,240,722 | Snow | May 6, 1941 |
| 2,292,230 | Lemon | Aug. 4, 1942 |
| 2,324,270 | Schlerman | July 13, 1943 |
| 2,361,549 | Kott | Oct. 31, 1944 |
| 2,382,439 | Osborn | Aug. 14, 1945 |
| 2,411,741 | Michaelson | Nov. 26, 1946 |
| 2,442,910 | Thomson | June 8, 1948 |
| 2,474,098 | Dimmick | June 21, 1949 |
| 2,494,440 | Haynes | Jan. 10, 1950 |
| 2,583,132 | Altar et al. | Jan. 22, 1952 |

OTHER REFERENCES

Electrical Engineering, January 1935, pages 44 and 45.